Y2587 OR 3,700,859

X65477 X64424

United States Patent

Laurer et al.

[15] 3,700,859

[45] Oct. 24, 1972

[54] PROGRAMMABLE KEY AND LOCK

[72] Inventors: George J. Laurer; Ralph O. Skatrud, both of Raleigh, N.C.

[73] Assignee: International Business Machines Corporation, Armonk, N.Y.

[22] Filed: March 19, 1971

[21] Appl. No.: 126,213

[52] U.S. Cl..235/61.7 R, 235/61.12 N, 235/61.11 E, 340/347 DD

[51] Int. Cl.....G06k 7/10, G06k 15/00, G06k 19/06

[58] Field of Search............235/61.7 B, 61.7 R, 154; 340/349 A, 174.1 H, 347 DD; 325/38, 321

[56] References Cited

UNITED STATES PATENTS

| | | | |
|---|---|---|---|
| 3,519,989 | 7/1970 | Houle et al. | 235/61.7 B |
| 3,588,449 | 6/1971 | Paterson | 235/61.7 B |
| 3,601,805 | 8/1971 | Snook | 235/61.7 B |
| 3,602,695 | 8/1971 | Boss | 235/61.7 B |
| 3,510,780 | 5/1970 | Buehrle | 325/321 |

*Primary Examiner*—Daryl W. Cook
*Attorney*—Hanifin and Jancin and Robert B. Brodie

[57] ABSTRACT

A programmable electronic lock and key in which the key consists of a card having non-visible coded indicia thereon designating an address in memory and the contents thereof. The lock includes a card reader for scanning the coded indicia, memory means storing arbitrary patterns at designated locations; and means for comparing the scanned card data and the data extracted from the memory address specified by the card. A mismatch indicates a non-valid key.

11 Claims, 12 Drawing Figures

INVENTORS
GEORGE J. LAURER
RALPH O. SKATRUD

BY Robert Bruce Brodie
ATTORNEY

| | | | | |
|---|---|---|---|---|
| A = 9<br>A' = 13 | B' = 13<br>B = 9 | A < B' & A' > B | ∴ BIT 1 = 1 | TIME = 1 BIT |
| A = 4<br>A' = 7 | B' = 13<br>B = 9 | A < B' BUT A' IS NOT > B | ∴ BIT 2 = 0 | 1 BIT ≠(≥) 2 BIT |
| A = 7<br>A' = 12 | B' = 13<br>B = 9 | A < B' & A' > B | ∴ BIT 3 = 1 | 2 BIT = 3 BIT |
| A = 7<br>A' = 12 | B' = 6<br>B = 5 | A IS NOT < B' ALTHOUGH A' > B | BIT 4 = 0 | 3 BIT ≠(≤) 4 BIT |

FIG. 7B ANALOG/DIGITAL CONVERTER

PROGRAMMABLE KEY AND LOCK

BACKGROUND OF THE INVENTION

This invention relates to a key and lock system especially for use with operator actuated data entry and output indicating terminals.

Security and prevention of unauthorized access to data and their mechanical processing systems have received recent and increasing emphasis. Much attention has been paid to the unauthorized use of data entry and output terminals. Analogous attention has been paid to credit card operated devices. The first cut and try at solving this problem contemplated the use of mechanical keys. An operator or other person would gain access to the system by key insertion into the lock cylinder. If the key were compromised then new keys and lock cylinders would have to be mechanically substituted. Recognition should be accorded to the large variety of prior art electromechanical and electronic locks operative to be responsive to coded signals. Illustratively, in one system a "key" consisting of an oscillator was used to tune or detune a resonant circuit in the lock sufficient to cause appropriate relays to open and close, thus releasing the lock. A variant of resonant tuning or detuning to control lock action was incorporated in another system and related to the use of a "key card" narrow band frequency transmitter which activated a door lock upon the generated frequency being within the pass band.

A magnetically coded card insertable into a corresponding lock was found in yet another system. The card actuated an appropriate magnetically responsive switching or latching arrangement. Other approaches included cards bearing scrambled data inserted into a lock or equivalent, which data was mechanically read and compared with manual data entered by the card holder.

The foregoing mechanical key and lock substitutes employ a simple comparison match between the key insert and the card. There is virtually no way to easily include or exclude classes of key holders without having to alter the physical structure of both the key and lock.

SUMMARY OF THE INVENTION

The foregoing disadvantages of the prior art are unexpectedly overcome in an embodiment of an electronic lock and key system comprising an addressable memory medium having preselected locations therein containing arbitrary coded patterns; a receptacle adapted to retain a key type device such as a coded card; means for scanning the retained card and deriving therefrom a memory address code and an arbitrary number; means responsive to the derived memory address code for extracting the contents of the corresponding memory location; comparison means for providing signal indication of the match or mismatch condition between the extracted memory contents and the card derived arbitrary number; and means responsive to a mismatch signal from the comparison means for maintaining the lock inoperative.

In particular, the preferred embodiment contemplates an optically scanned card reader and a code disc operative as the memory medium. Electrical signals representative of the address code portion of the scanned card cause the code disc to be rotated and positioned before another optical scanner. Signals corresponding to the arbitrary number encoded at the sector address together with the card read information are supplied to respective analog to digital converters. The converter outputs, in turn, are compared with each other such that an identical match condition is the prerequisite to opening the lock. If it is desired to alter or lock out classes of card holders, then mere alteration of the memory contents suffices. Furthermore, changing keys is merely the printing of the suitably coded card. In this connection, it should be pointed out that this arrangement functions as a true programmable key and lock. It may be conveniently combined with a system requiring the card bearer to manually enter code indicia. In this regard, the manual indicia is useful for relating the bearer to the card key. Prior art systems failed to differentially relate the key to the lock and offer a simple method and apparatus for the rapid alteration of access structure by merely changing memory contents.

BRIEF DESCRIPTION OF THE DRAWINGS

FIG. 7B is a logical diagram of the analog to digital converter whose waveform and timing diagrams are set forth in FIGS. 5 and 6.

DESCRIPTION OF THE PREFERRED EMBODIMENT

Figure 1:
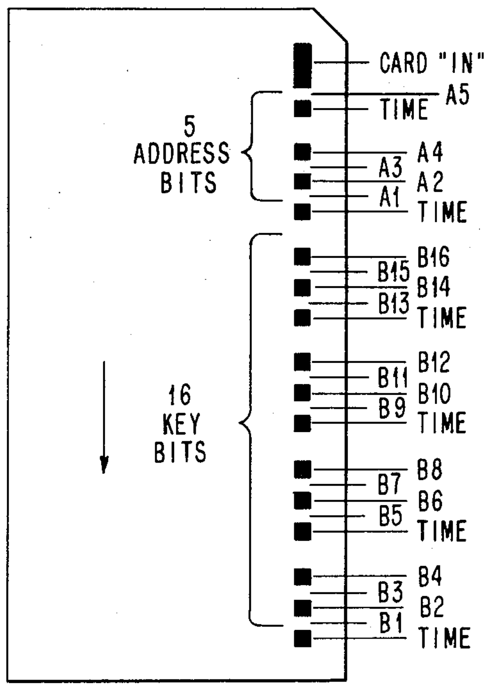
FIG. 1 shows a "card key" bearing coded indicia thereon in delta distance code according to the invention.

Referring now to FIG. 1 of the drawing, there is shown a credit card or similar code bearing instrument normally used and retained by the bearer in a manner similar to that of a mechanical key. To avoid unauthorized tampering, reproduction or simulation of the card it is desired to have the coded indicia non-visible to the bearer. The card is formed from a tough suitable plastic such as titanium dioxide filled polyvinyl chloride. Indicia may be encoded on the card with any pigment absorbing in a non-visible region such as infra red, which pigment also reflects as white in the visible region. Such a visible white on white card is codable for instance, in delta distance code. In this regard, *m* coded preselected digits designate an address location in a memory and *n* preselected digits define the prescribed contents of the address. A capacity of $2^{m+n}$ distinquishable arrangements are thus possible.

Figure 2:
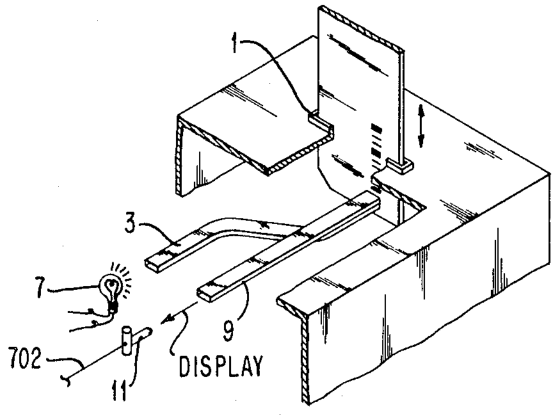
FIG. 2 is a perspective view of an optical card reader adapted to retain and scan the inserted "card key" of FIG. 1.
Figure 7A:
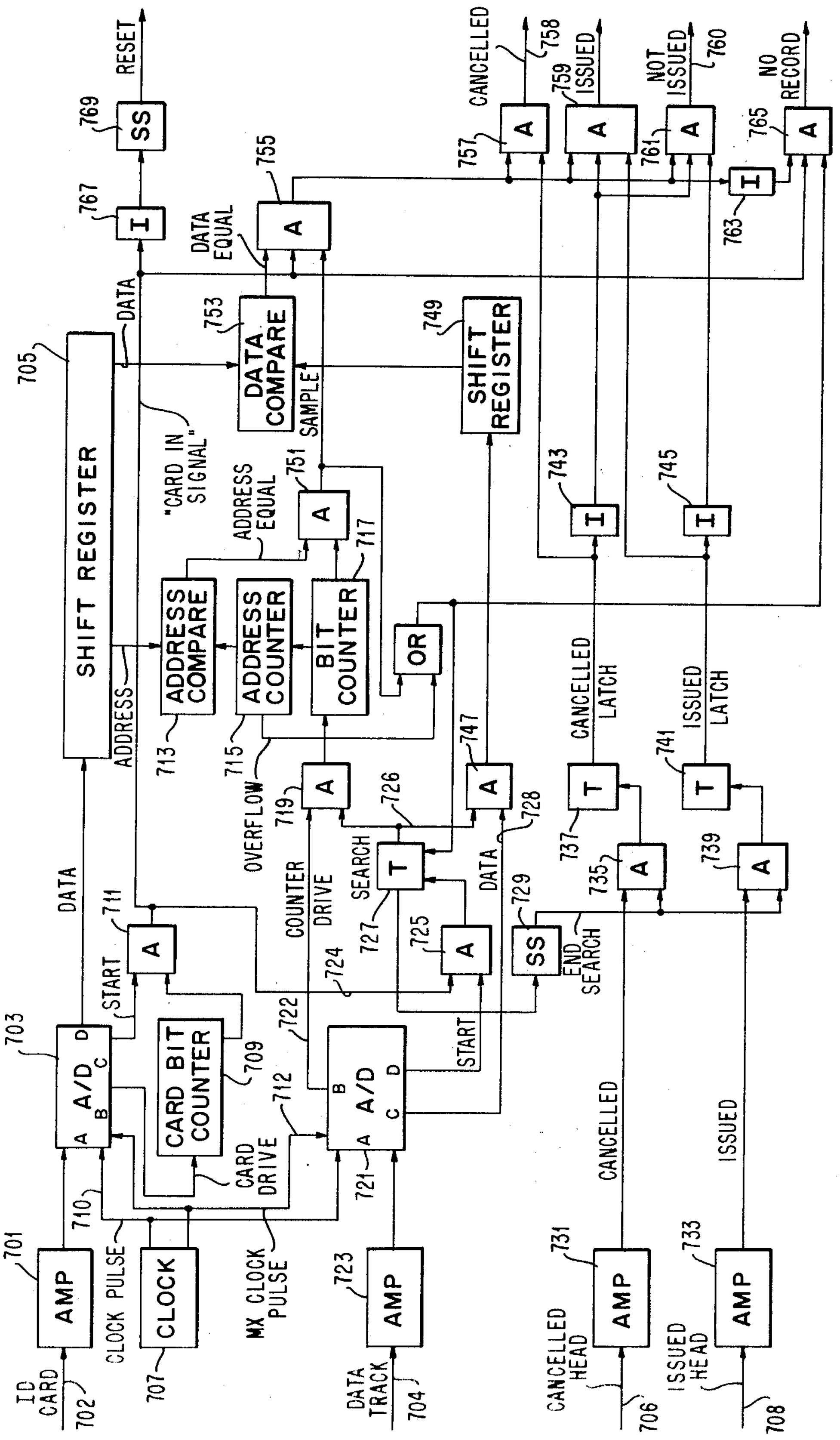
FIG. 7A shows a logic arrangement for providing the electronic signal indication of the match or mismatch condition between the coded card indicia and memory.
Figure 7C:
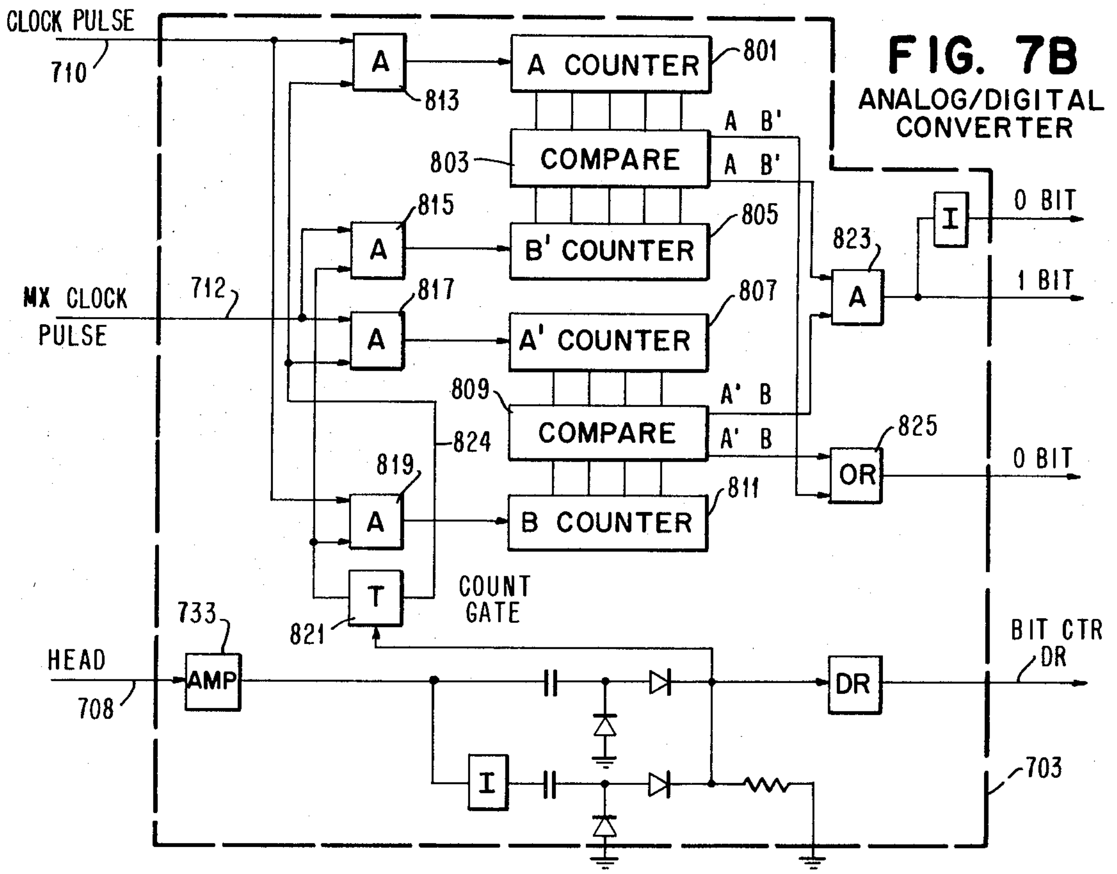
FIG. 7C shows the clock logic for FIG. 7B.
Figure 7C:
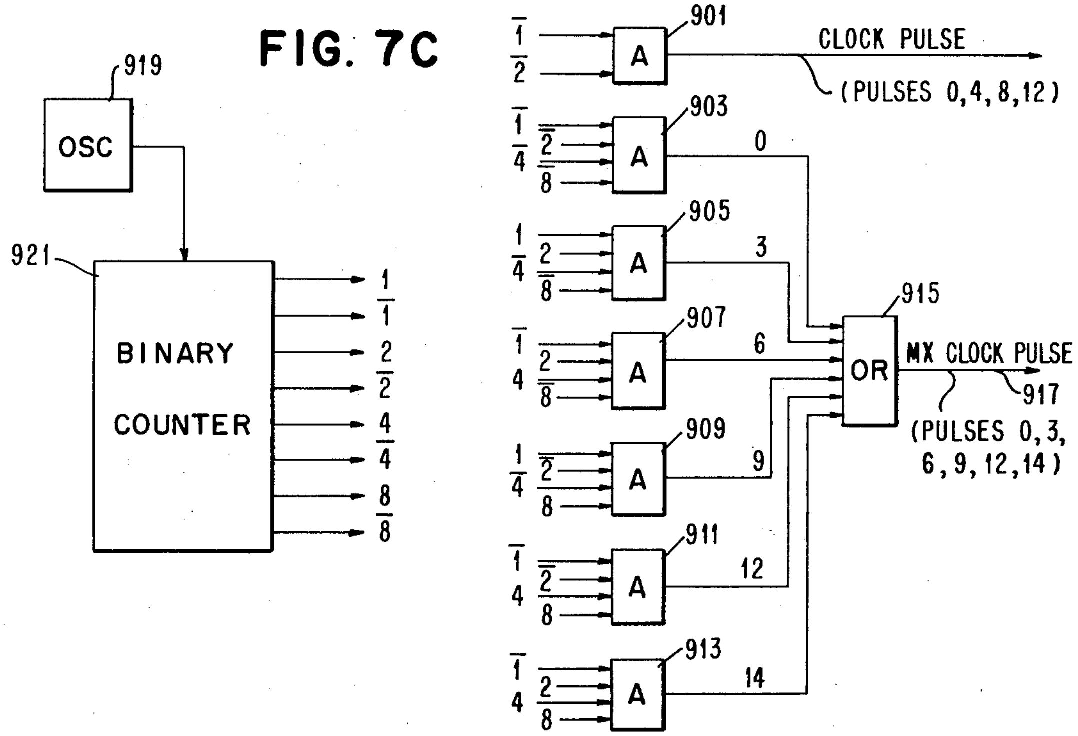

Referring now to FIG. 2 of the drawing, there is shown a card reader suitable for use with the encoded card. The card is inserted in receptacle 1, where it is illuminated by non-visible light propagated through fiberglass bundle 3 from infra red source 7. Reflected light is propagated through fiberglass bundle 9. Photo diodes 11 terminating the fiberglass bundle responsive to the wavelengths of interest convert the incident reflected light to corresponding electrical signals. The reading may be instrumented by serially scanning a preselected portion of the card in numerous ways available to the art. As shown in FIG. 7A, the scanned card signals drive an analog to digital converter 703 through amplifier 701. An example of contemporary card coding (delta distance coding) is illustrated in copending patent application 031959, filed Apr. 27, 1970 and entitled "Retrospective Pulse Modulation and Apparatus Therefore" in the name of Ernie G. Nassimbene.

Figure 3:
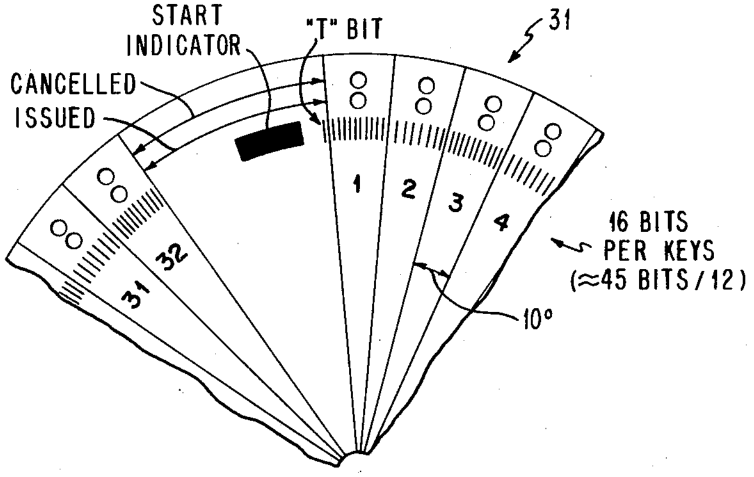
FIG. 3 illustrates a portion of the optically readable disc having delta distance coded information thereon and operative as a memory medium according to the invention.

In FIG. 3, there is shown an optically scannable memory disc 31 capable of storing an arbitrary number in each of *m* distinguishable "addresses" or angular sectors of the disc. The arbitrary numbers may also be delta distance coded. Thus, for *m* equal to five, then 32 sectors (shown consecutively numbered) are laid out on the disc. Along the peripheral edge, a punched hole code is shown indicating whether a card has been issued or cancelled.

Figure 4:
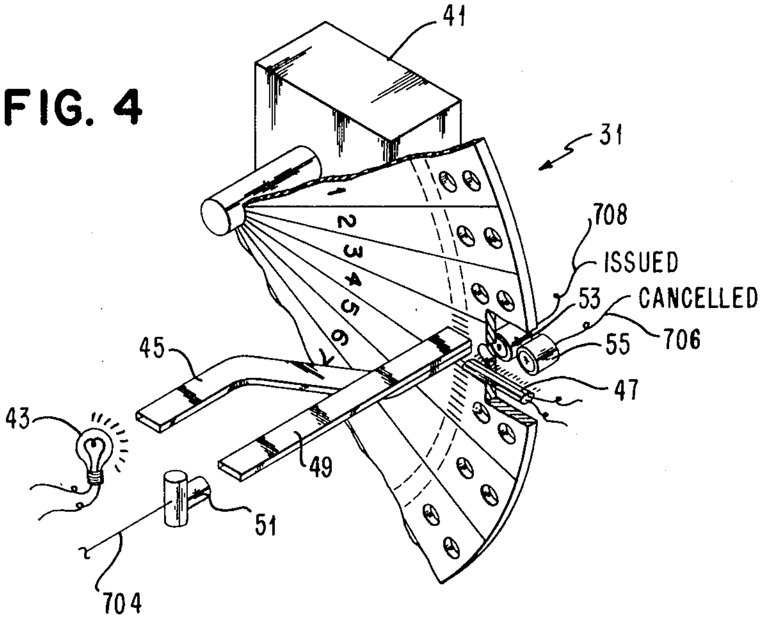
FIG. 4 shows the code disc shaft mounted and scannable by optical means.

FIG. 4 shows the disc 31 shaft mounted on motor 41. A light source 43 illuminates the sector address contents of the disc through fiberglass bundle 45. The delta distance modulated reflected light is propagated by fiberglass bundle 49. Photo detector 51 converts the modulated light into an analog electric signal. Another light source 47 illuminates the issued-cancelled coded hole positions associated with each disc sector. Photo detectors 53 and 55 convert any light through corresponding disc apertures into equivalent signals.

Figure 8A:
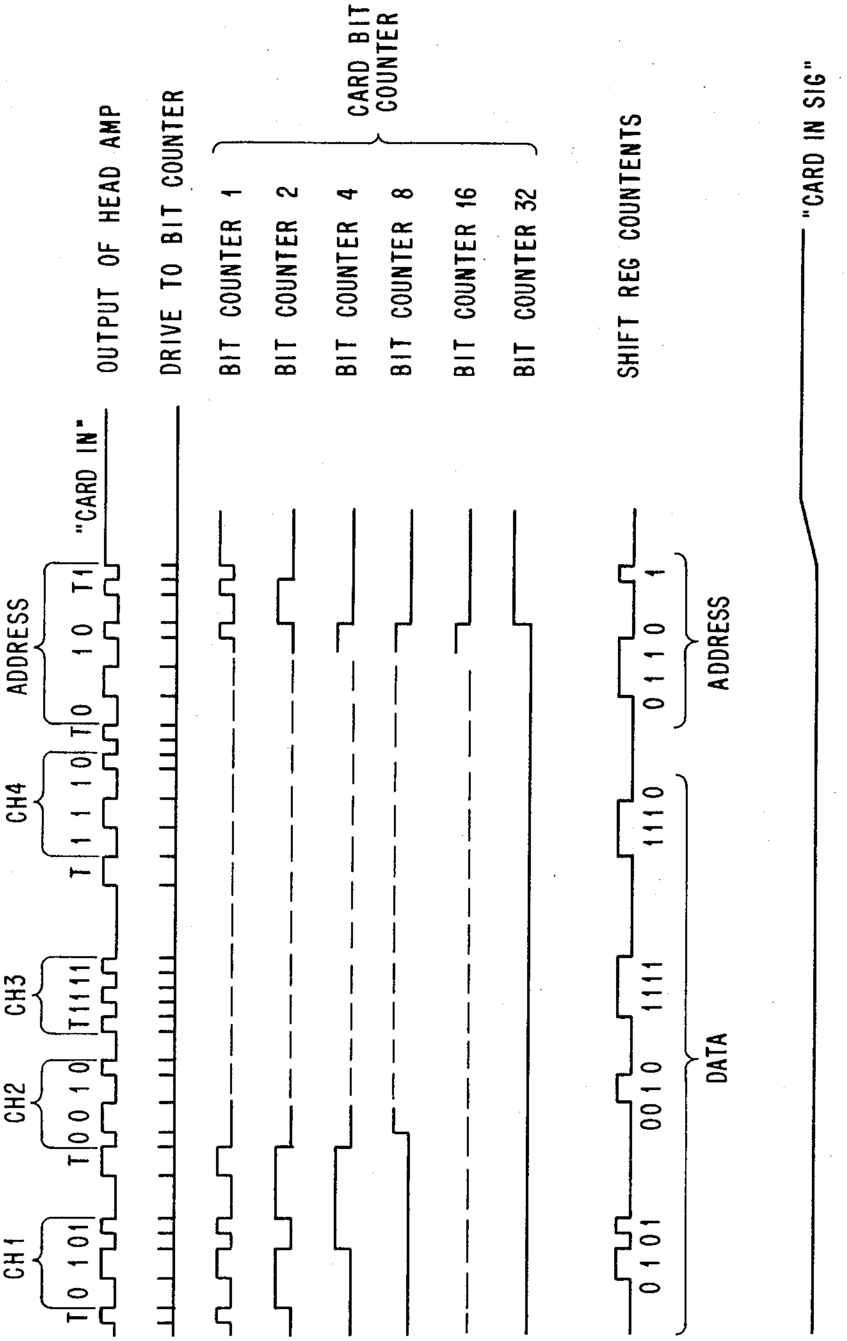
FIGS. 8A and 8B are the timing and waveform diagrams for the logical arrangement for FIG. 7A.
Figure 8B:
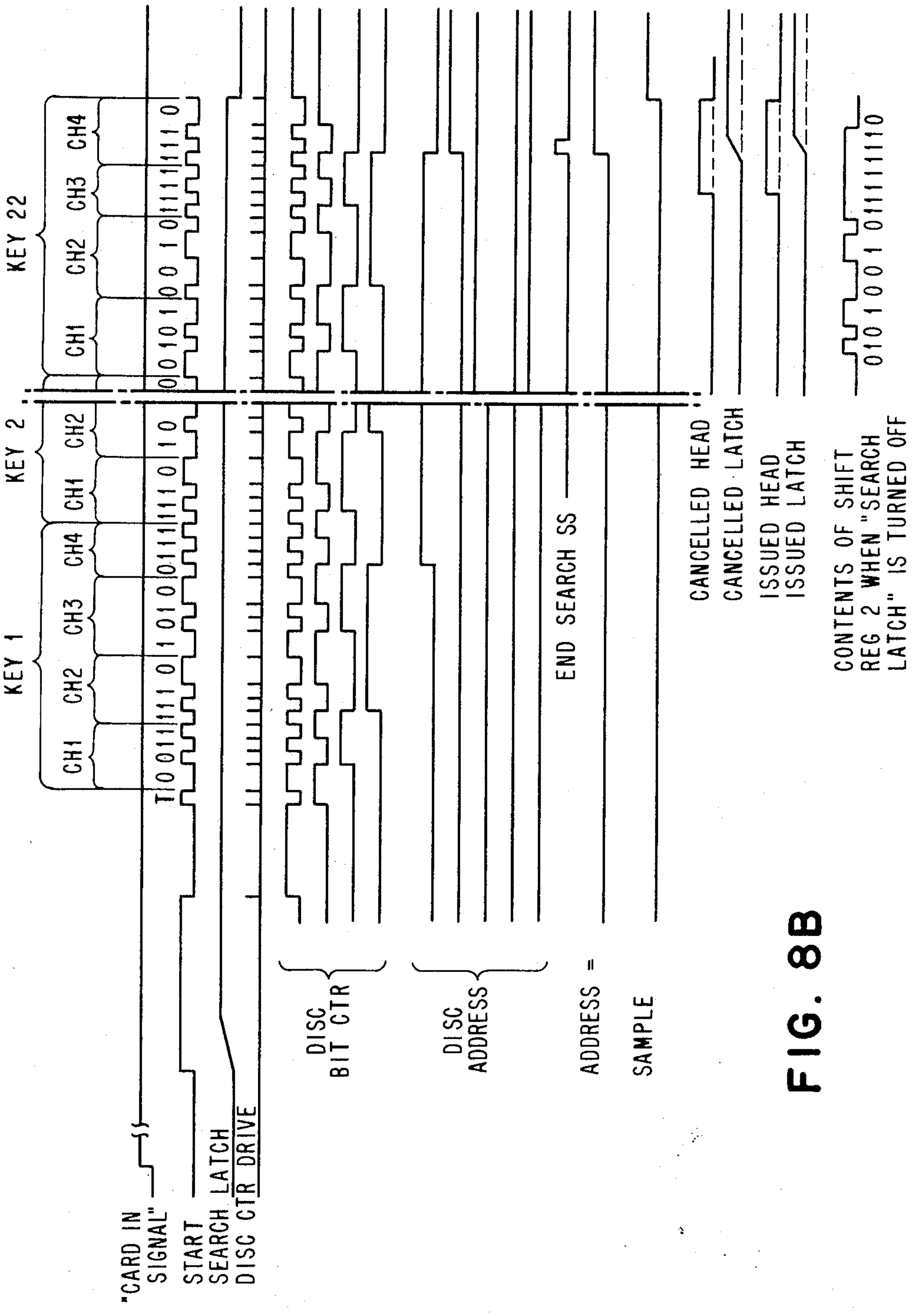
Figure 8C:
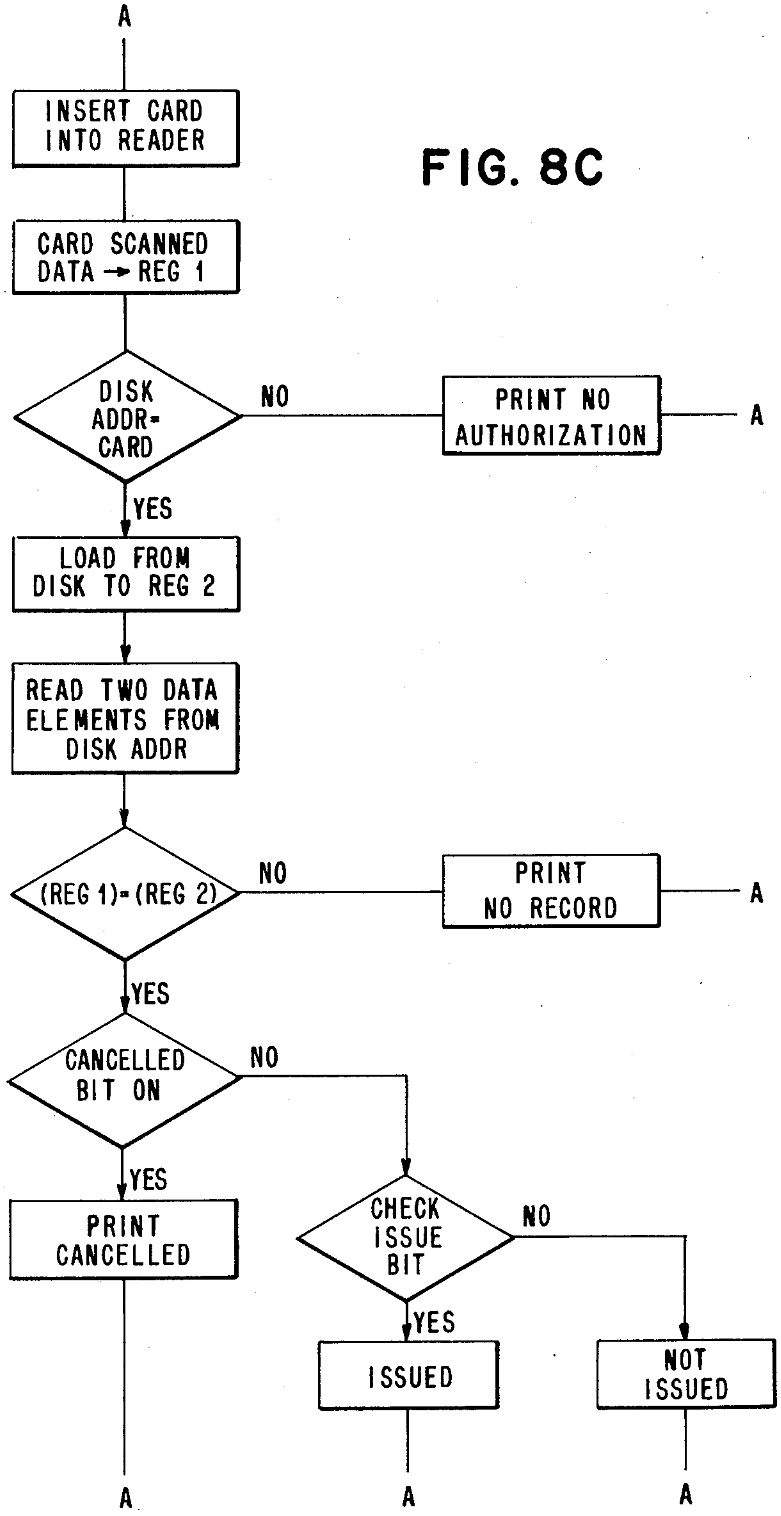
FIG. 8C is a flow diagram expositive of the information handling steps according to the invention.

Referring now to FIG. 7A taken together with FIG. 8C, there is shown a logic arrangement for electrically comparing and determining the optically read card and memory information and ultimately unlocking the terminal in response to a valid card. The electrical signals representative of the card read data is applied to the logic arrangement over path 702 to analog/digital converter 703 through amplifier 701. Likewise, the information derived from the disc data track is applied to analog/digital converter 721 over path 704 and amplifier 723. Converters 703 and 721 generate binary digital sequences responsive to analog coded (delta distance code) signals. Reference may be made to FIG. 7B for the detailed logical design of the converters.

The digitalized card data is loaded into shift register 705. Similarly, the digitalized disc data address is loaded in address counter 715 from bit counter 717. In this regard, a disc address may be set up by driving counter 717 by signals on enabling AND gate 719. If the address portion of the card data contained in shift register 705 matches the address in counter 715, then the "address equal" input to AND gate 755 is enabled through gate 751.

Concomitant with the address comparison, a data comparison is made between the data portion of the card and the contents read from the disc sector address. Accordingly, the digitalized disc data loaded into shift register 749 from converter 721 is compared with the card data in register 705. If the data match, then the data equal input to gate 755 is enabled. Lastly, the card insertion enables the remaining gate 755 input.

It may be desirable to provide an output indication that the card is accepted or rejected. Attention is directed to gates 757, 759, 761, 763, and 765. The output from gate 755 is one input to the output indicating gates. The other input is derived from the optically scanned "issue/cancel" tracks whose signals appear on paths 708 and 706.

Operationally, the sequence is triggered by the insertion of the "key" card into the card reader. The output of the reader enters the logic arrangement through converter 703 into shift register 705. Clock pulses derived from the card read operation both drive and time the converters 703 and 721. Parenthetically, the B converter output drives a corresponding bit counter 703, 709; 721, 717. The signal indicative of card insertion is provided by converter 703 and card bit counter 709. Timing is derived from the disc. Relatedly, FIG. 8A shows typical timing on the card read operation, while FIG. 8B illustrates the time and waveforms involved on the disc read and compare operation.

Figure 5:
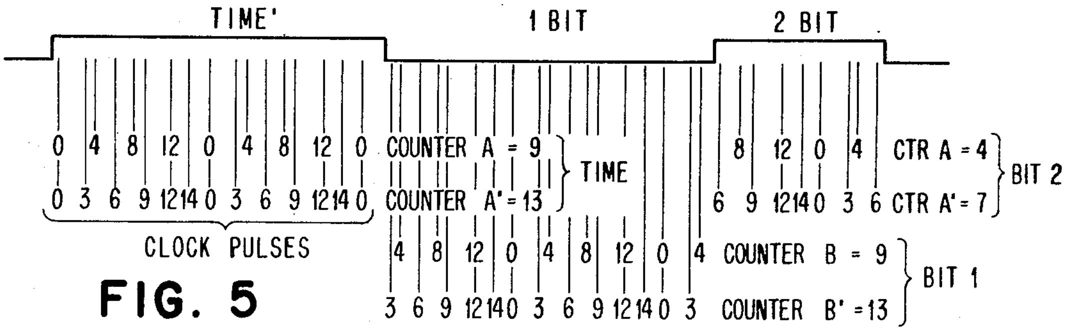
FIGS. 5 and 6 are timing and waveform diagrams applicable to the conversion of delta distance code into a binary pulse stream.
Figure 6:
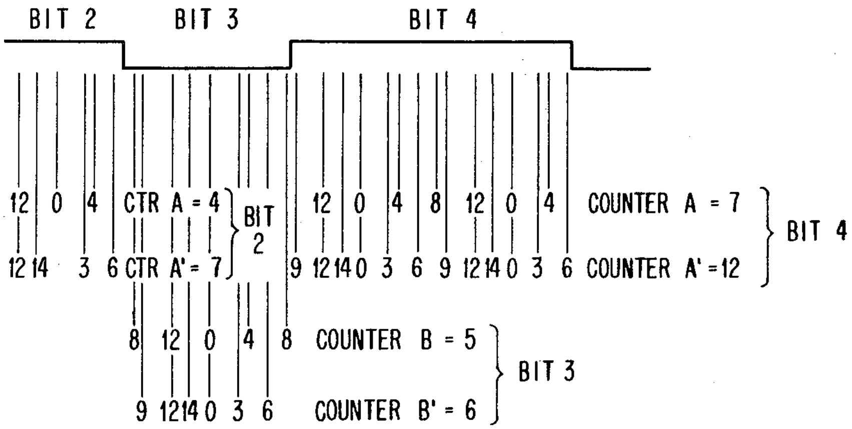

Referring now to FIGS. 5 and 7B, there are shown logic and timing diagrams of the analog to digital converters set forth in FIG. 7A. In delta distance coding, data is encoded in terms of the spacing between successive bars on the code bearing surface. Thus, for a constant scan rate along a linear path, the events which are ascertained are the time intervals T between successive detected bars or stripes. The converter generates a binary 1 or 0 by comparing successive time intervals. That is, if $T_n = T_{n-1}$, then a "1" is generated. If $T_n \neq T_{n-1}$, then a "zero" is generated. In this regard, the intervals were measured at time $n-1$ and $n$ respectively.

A clocking pulse train of frequency F is applied from clock 707 on path 710. A multiple of the clock frequency $m$F also derived from clock 707 is applied to path 712, $m$ lying in the range $1 \leq m <<< 2$. The clock frequency drives counters 801 (A) and 811 (B) respectively through AND gates 813 and 819. The $m$F train drives counters 805 (B′) and 807 (A′) through gates 815 and 817 respectively. The gates 813, 815, 817, and 819 are enabled by a signal from count gate 821. Comparators 803 and 809 provide a relative comparison magnitude indication between respective registers of the pairs A and B′ and A′ and B. Accordingly, comparator 803 generates a signal indicative of $A > B'$ or $A < B'$. Likewise, comparator 809 yields either an $A' > B$ or $A' < B$ signal.

A "one" bit is generated from gate 823, if $A < B'$ and $A' > B$. A "zero" bit is generated from gate 825, if either $A > B'$ or $A' < B$ or both. Pulses indicative of optically scanned bars are transmitted over path 708 and amplifier 733. Significantly, gate 821 is a reversible switch coupling either path 822 or 824 in response to successive pulses on path 708.

During time interval $T_1$, suppose gate 821 enables AND gates 819 and 815. Consequently, the B and B′ counters will respectively count up to $F_1$ and $mF_1$ respectively. The next pulse over path 708 initiates the next time interval $T_2$. As a result, gate 821 disables gates 819 and 815 and turns on gates 817 and 813. Thus, counters A' and A will count up $mF_2$ and $F_2$ respectively. Assume $F_2 >> F_1$. Relating this back to the logical criteria, it is seen that $F_2 > mF_1$ and $A \nless B'$. A "one" will not be generated even though $mF_2 > F_1$ and $A' > B$ because the relation $A < B'$ is not true. Thus, a "-zero" bit from gate 825 will be applied to the converter output.

This description of the present invention has been given as an example and it will be understood that various changes in form and details may be made therein without departing from the spirit and scope of the invention.

What is claimed is:

1. In an electronic lock and key system suitable for use with data entry and display terminals and the like, the lock comprising:

an addressable memory medium having preselected locations therein containing arbitrary coded patterns;

a receptacle adapted to retain an insertable key type device having coded indicia thereon;

means for scanning the retained key type device and deriving therefrom a memory address and an arbitrary coded pattern;

means responsive to the derived memory address for extracting the contents from that location in the memory medium specified by the memory address;

comparison means for providing signal indication of the match or mismatch condition between the extracted memory contents and the arbitrary coded pattern; and means responsive to a mismatch signal from the comparison means for maintaining the lock inoperative.

2. In an electronic lock and key system according to claim 1, wherein;

the key type device comprises a titanium oxide filled polyvinyl chloride card and having coded indicia on the card surface formed from a pigment reflective in the visible light region and absorbent in a selected non-visible light region.

3. In an electronic lock and key system according to claim 2, wherein:

the pigment reflects white light in the visible light region and absorbs infrared light in the non-visible light region.

4. In an electronic lock and key system according to claim 1, wherein:

the indicia on the key type device is encoded in delta distance code, said delta code being formed from distance variations between successive markings or the like upon the code bearing surface.

5. In an electronic lock and key system according to claim 1, wherein the receptacle comprises:

means for insertably retaining the key type device;

means for scanning the key type device with light in the non-visible region; and means for converting reflected light variations into corresponding electrical variations.

6. In an electronic lock and key system according to claim 1, wherein the addressable memory medium includes:

a disc partitioned into sectors in which each sector constitutes a distinct memory location, the disc having an arbitrary pattern encoded at each address;

the extracting means comprise:

means for optically scanning the disc arbitrary patterns;

means for positioning the disc memory location designated by the derived memory address.

7. In an electronic lock and key according to claim 1, wherein the comparison means comprise:

a first and second register, means for converting the scanned key type coded indicia and the memory contents into corresponding digital representations;

means for loading the digital representation into the respective first and second register; and means for generating a first signal if the register contents match and a second signal if said contents mismatch.

8. In an electronic lock and key system suitable for use with data entry and display terminals; the lock comprising an addressable memory medium having preselected locations therein containing arbitrary digitally coded patterns;

a receptacle adapted to retain an insertable card having indicia thereon coded in delta distance code;

means for scanning the retained card and deriving a memory address and an arbitrary pattern in delta distance code;

means for converting the scanned delta distance code memory address into a digital memory address;

means responsive to the derived and converted digital memory address from the card for extracting the contents from the memory medium; said means coacting with the converting means for converting the memory address contents into a digital equivalent;

comparison means for providing signal indication between the match and mismatch condition between the card derived digitalized arbitrary pattern and the digitalized contents of the memory address; and means responsive to a mismatch signal for maintaining the lock inoperative.

9. In an electronic lock and key system according to claim 8, wherein the converting means comprise:

means responsive to successive abrupt signal changes from the delta distance code source defining successive time intervals T for generating a first binary value if $T_n = T_{n-1}$, and for generating a second binary value if $T_n \neq T_{n-1}$.

10. In an electronic key and lock system according to claim 9, wherein the converter comprises:

a source of signals of frequency $F$ and $mF$, where $m$ lies in the range $1 \leq m << 2$;

first counting means $A$ and $B$ drivable at a rate of F hertz;

second counting means $A'$ and $B'$ drivable at a rate of $mF$ hertz;

means for alternately coupling the first and second counting means to the signal source in response to successive delta distance coded signal variations defining successive time intervals; and means for generating a first binary value if $A(F_1) < B'(mF_2)$ and $A'(mF_2) > B(F_1)$ and for generating a second binary value if either $A(F_1) > B'(mF_2)$ or $A'(mF_2) < B(F_1)$ where $F_1$ and $F_2$ are frequencies applied at two distinctive time intervals 1 and 2.

11. An apparatus for converting delta distance coded sequences into corresponding binary sequences suitable for use, for example, in an electronic lock and key system comprising:

a source of signals of frequency $F$ and $mF$, where $m$ lies in the range $1 < m << 2$;

a first counting means $A$ and $B$ drivable at a rate of $F$ hertz;

a second counting means $A'$ and $B'$ drivable at a rate of $mF$ hertz;

means for alternately coupling the first and second counting means to the signal source in response to successive delta distance coded signal variations defining successive time intervals; and means for generating a first binary value if $A(F_1) < B'(mF_2)$ and $A'(mF_2) > B(F_1)$ and for generating a second binary value if either $A(F_1) > B'(mF_2)$ or $A'(mF_2) < B(F_1)$ where $F_1$ and $F_2$ are frequencies applied at two distinctive time intervals 1 and 2.

* * * * *